US011833899B2

(12) United States Patent
Kim et al.

(10) Patent No.: US 11,833,899 B2
(45) Date of Patent: Dec. 5, 2023

(54) ORGAN-TYPE ELECTRONIC PEDAL APPARATUS

(71) Applicants: Hyundai Motor Company, Seoul (KR); Kia Corporation, Seoul (KR); Kyung Chang Industrial Co., Ltd., Daegu (KR)

(72) Inventors: Eun Sik Kim, Gwangmyeong-si (KR); Hyeon Uk Kim, Daegu (KR); Ji Soo Kim, Daegu (KR); Jong Hwan Han, Daegu (KR)

(73) Assignees: HYUNDAI MOTOR COMPANY, Seoul (KR); KIA CORPORATION, Seoul (KR); KYUNG CHANG INDUSTRIAL CO., LTD., Daegu (KR)

( * ) Notice: Subject to any disclaimer, the term of this patent is extended or adjusted under 35 U.S.C. 154(b) by 0 days.

(21) Appl. No.: 17/840,784

(22) Filed: Jun. 15, 2022

(65) Prior Publication Data

US 2023/0173916 A1    Jun. 8, 2023

(30) Foreign Application Priority Data

Dec. 2, 2021   (KR) .......................... 10-2021-0170969

(51) Int. Cl.
*B60K 26/02*   (2006.01)
*B60T 7/04*    (2006.01)

(52) U.S. Cl.
CPC ............ *B60K 26/021* (2013.01); *B60T 7/042* (2013.01); *B60T 2220/04* (2013.01)

(58) Field of Classification Search
CPC ... B60K 26/021; B60T 7/042; B60T 2220/04; G05G 1/30; G05G 1/38; G05G 1/44; G05G 5/03
See application file for complete search history.

(56) References Cited

U.S. PATENT DOCUMENTS

| | | | | |
|---|---|---|---|---|
| 7,984,664 B2 * | 7/2011 | Kim | ....................... | G05G 25/02 74/513 |
| 8,534,157 B2 * | 9/2013 | O'Neill | ..................... | G05G 1/30 74/513 |
| 8,635,930 B2 * | 1/2014 | Willemsen | ............... | G05G 5/03 74/514 |

FOREIGN PATENT DOCUMENTS

| | | | | |
|---|---|---|---|---|
| DE | 102006035882 A1 * | 2/2008 | ............. | B60K 26/02 |
| EP | 1798098 A1 * | 6/2007 | ........... | B60K 26/021 |
| KR | 10-2020-0070946 A | 6/2020 | | |

OTHER PUBLICATIONS

Machine translation of DE-102006035882-A1, obtained from Fit database, 2008 (Year: 2008).*
Machine translation of EP-1798098-A1, obtained from Fit database, 2007 (Year: 2007).*

* cited by examiner

*Primary Examiner* — Thomas C Diaz
(74) *Attorney, Agent, or Firm* — Morgan, Lewis & Bockius LLP

(57) ABSTRACT

The present disclosure relates to an organ-type electronic pedal apparatus including a high-load spring module 500 and a hysteresis lever 400 and capable of tuning a pedal effort, a stroke, and a hysteretic force, which are required to vary depending on the types of vehicles, by changing components of the hysteresis lever 400, as necessary.

17 Claims, 12 Drawing Sheets

ORGAN-TYPE ELECTRONIC PEDAL APPARATUS

CROSS-REFERENCE TO RELATED APPLICATION

The present application claims priority to Korean Patent Application No. 10-2021-0170969, filed Dec. 2, 2021, the entire contents of which is incorporated herein for all purposes by this reference.

TECHNICAL FIELD

The present disclosure relates to an organ-type electronic pedal apparatus, and more particularly, to a technology related to an organ-type electronic brake pedal apparatus capable of tuning a pedal effort, a stroke, and a hysteretic force desired by a driver by changing components of a hysteresis lever.

BACKGROUND

In general, pedal apparatuses for a vehicle are classified, depending on maintaining structures, into a pendant-type pedal apparatus installed by being hung on a dash panel and an organ-type pedal apparatus installed on a floor panel.

The pendant-type pedal apparatus has a pedal pad having a rotation center disposed at an upper side thereof, such that a driver operates the pendant-type pedal apparatus by pressing a lower portion of the pedal pad or pushing the pedal pad forward by using a front part of the driver's foot. The organ-type pedal apparatus has a pedal pad having a rotation center disposed at a lower side thereof, such that a driver operates the organ-type pedal apparatus by rotating an upper portion of the pedal pad forward.

The advantage of the organ-type pedal apparatus is that an area of the pedal pad pushed by the driver's foot is large, and a motion of the pedal pad is similar to a trajectory of the driver's foot, which makes it possible to improve operating characteristics. Therefore, the driver may more comfortably operate the organ-type pedal apparatus in comparison with the pendant-type pedal apparatus.

However, the currently used organ-type pedal apparatus cannot effectively cope with pedal efforts, strokes, and hysteretic forces required to vary depending on the types of vehicles. For this reason, the entire pedal apparatus needs to be newly manufactured to meet the requirement, which requires a large amount of investment cost.

The foregoing explained as the background is intended merely to aid in the understanding of the background of the present disclosure, and is not intended to mean that the present disclosure falls within the purview of the related art that is already known to those skilled in the art.

SUMMARY

An object of the present disclosure is to provide an organ-type electronic pedal apparatus including a high-load spring module and a hysteresis lever, the organ-type electronic pedal apparatus being capable of tuning a pedal effort, a stroke, and a hysteretic force, which are required to vary depending on the types of vehicles, by changing components of the hysteresis lever, thereby reducing costs, simplifying the configuration, miniaturizing the package, and reducing production costs.

To achieve the above-mentioned object, the present disclosure provides an organ-type electronic pedal apparatus including: a pedal housing; a pedal pad rotatably coupled to the pedal housing by a hinge pin and to be manipulated by a driver; a hysteresis lever positioned in the pedal housing and having a lower side being in contact with the pedal housing and an upper side inserted into the pedal pad and being in contact with an inner surface of the pedal pad, the hysteresis lever to generate hysteresis by a frictional force between the pedal pad and the hysteresis lever when the pedal pad rotates; and a spring module installed to be supported on the pedal pad and the hysteresis lever.

The organ-type electronic pedal apparatus may further include a plurality of stroke sensors fixed to the pedal housing, connected to the pedal pad, and configured to generate signals related to a pedal function when the pedal pad rotates.

The pedal pad may include: a box-shaped pad part having a pad surface to be manipulated by the driver's foot, one end of the spring module is inserted into the pad part and rotatably installed, and an upper side of the hysteresis lever is inserted into the pad part and in contact with an inner surface of the pad part; and a pedal arm part having one end connected to the pad part and the other end coupled to the hinge pin and connected to at least one of the stroke sensors.

The pad part and the pedal arm part may be connected in an L shape.

A sensor pin may be disposed on the pedal arm part and disposed above the hinge pin, the sensor pin may be coupled to a sensor lever of at least one of the stroke sensors.

The pad part may penetrate a housing hole disposed in the pedal housing and be inserted into the pedal housing or protrude from the pedal housing depending on a rotation of the pedal pad, and the pedal arm part may be positioned always in the pedal housing regardless of the rotation of the pedal pad.

A housing hole may be disposed in the pedal housing, the pad part may penetrate the housing hole, and a foreign-substance-inflow-prevention guide may be coupled along a rim of the housing hole.

The hysteresis lever may include: a lower bottom part having circular hinge parts disposed at two opposite left and right sides of the lower bottom part and installed to be in line contact with the pedal housing; and two opposite lateral parts connected to the circular hinge parts and extending upward, the two opposite lateral parts being inserted into the pad part and respectively having upper inner surfaces connected to the spring module and upper outer surfaces being in contact with left and right inner surfaces of the pad part.

The lower bottom part and the two opposite lateral parts may be connected in a U shape.

A rubber damper may be coupled to the lower bottom part and create a pedal effort while being elastically deformed by contact with the pedal arm part when the pedal pad rotates.

Arc-shaped inclined grooves may be disposed in upper end inner surfaces of the two opposite lateral parts, the spring module maybe rotatably seated in the arc-shaped inclined grooves, the arc-shaped inclined grooves may guide a downward movement of the spring module when the spring module is compressed by a rotation of the pedal pad, arc-shaped inclined protrusions may be disposed on the spring module, matched in shape with the arc-shaped inclined grooves, and installed to be inserted into the arc-shaped inclined grooves, and the arc-shaped inclined protrusions may protrude toward two opposite sides.

The arc shapes of the arc-shaped inclined grooves may be disposed in a forward/rearward direction of the two opposite lateral parts, the inclinations of the arc-shaped inclined grooves may be disposed in an upward/downward direction of the two opposite lateral parts, and the arc-shaped inclined grooves may be inclined so that an interval between the two opposite lateral parts decreases toward the lower bottom part.

A cross-sectional thickness of the lower bottom part of the hysteresis lever may be smaller than a cross-sectional thickness of each of the two opposite lateral parts so that the two opposite lateral parts of the hysteresis lever move outward away from each other with respect to the circular hinge part when the pad part is inserted into the pedal housing by the rotation of the pedal pad and the arc-shaped inclined protrusions move downward along the arc-shaped inclined grooves of the hysteresis lever while the spring module is compressed.

A cross-sectional thickness of each of the two opposite lateral parts of the hysteresis lever may be larger than a cross-sectional thickness of the lower bottom part so that a high frictional force is implemented when the pad part is inserted into the pedal housing by the rotation of the pedal pad, the arc-shaped inclined protrusions move downward along the arc-shaped inclined grooves of the hysteresis lever while the spring module is compressed, and the two opposite lateral parts of the hysteresis lever move outward away from each other with respect to the circular hinge part and come into contact with the left and right inner surfaces of the pad part.

Guide grooves may be disposed in upper end outer surfaces of the two opposite lateral parts and extend along a rotation radius of the pedal pad, guide protrusions may be disposed in the left and right inner surfaces of the pad part so as to extend along the rotation radius of the pedal pad and inserted into the guide grooves, and the coupling between the guide grooves and the guide protrusions may prevent forward and rearward movements of the hysteresis lever when the pedal pad rotates.

The pad part may be inserted into the pedal housing by the rotation of the pedal pad, the arc-shaped inclined protrusions may move downward along the arc-shaped inclined grooves of the hysteresis lever while the spring module is compressed, and the two opposite lateral parts of the hysteresis lever may move outward away from each other with respect to the circular hinge part, such that a force applied by the two opposite lateral parts of the hysteresis lever to press the left and right inner surfaces of the pad part may be increased, the frictional force may be increased, and the increased frictional force may implement high hysteresis when the pedal pad is manipulated.

When the pedal pad normally rotates, a lower end of the spring module and the lower bottom part of the hysteresis lever may be always kept spaced apart from each other regardless of a downward movement and compression of the spring module.

In a case in which the spring module abnormally moves downward excessively so that the arc-shaped inclined protrusions of the spring module separate from the arc-shaped inclined grooves of the hysteresis lever when the spring module moves downward while the pad part is inserted into the pedal housing by the rotation of the pedal pad, a lower end of the spring module may come into contact with the lower bottom part of the hysteresis lever such that hysteresis is prevented from excessively increasing.

The organ-type electronic pedal apparatus may be an accelerator pedal apparatus or a brake pedal apparatus.

The organ-type electronic pedal apparatus according to the present disclosure includes the high-load spring module and the hysteresis lever. The organ-type electronic pedal apparatus may tune the pedal effort, the stroke, and the hysteretic force, which are required to vary depending on the types of vehicles, by changing the components of the hysteresis lever, as necessary. Therefore, it is possible to reduce costs, simplify the configuration, miniaturize the package, reduce production costs, and minimize the fatigue of the driver's ankle.

DETAILED DESCRIPTION

Figure 1:
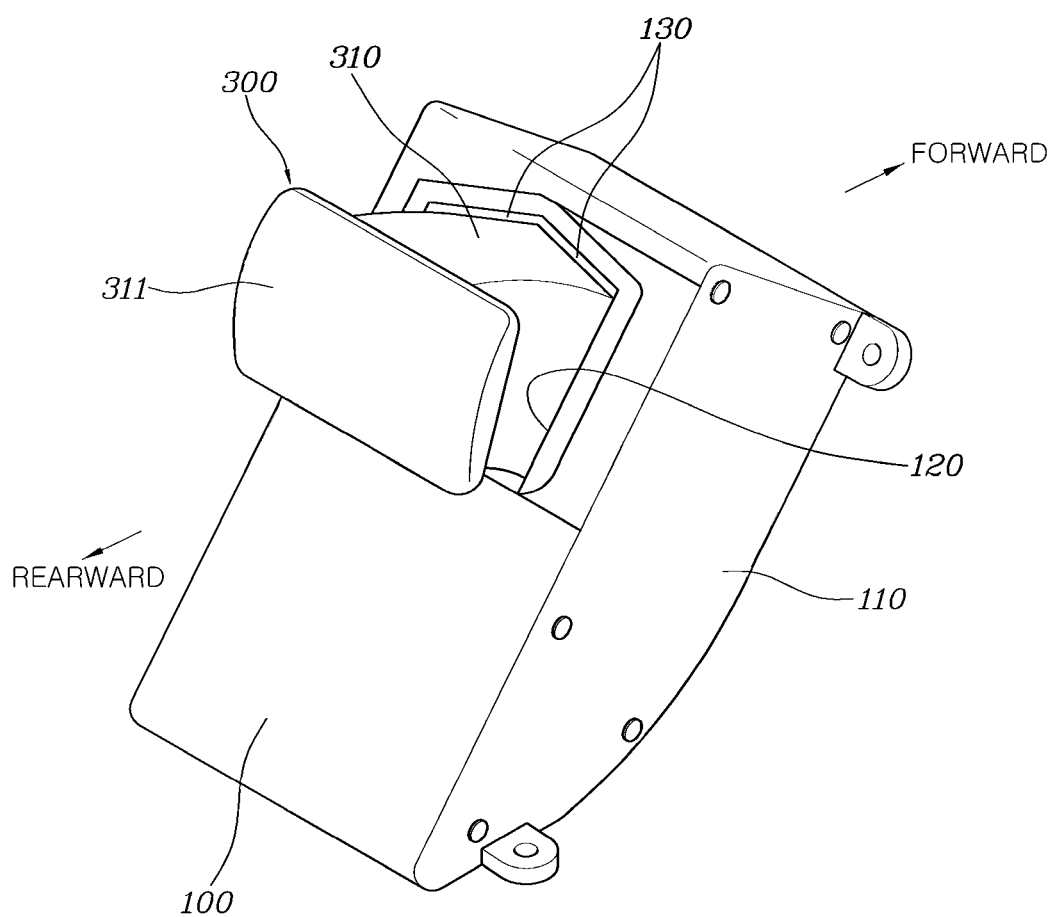
FIG. 1 is a view illustrating an organ-type electronic pedal apparatus according to the present disclosure.
Figure 2:
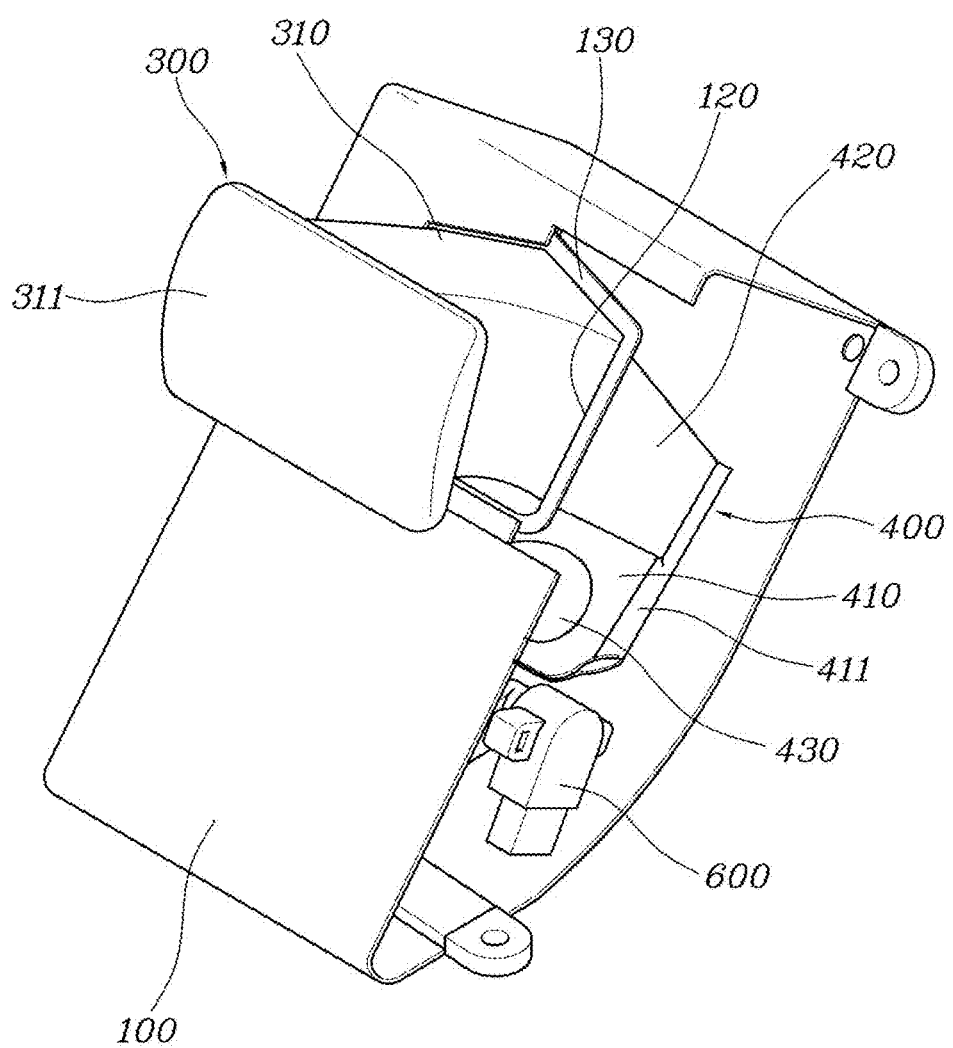
FIG. 2 is a view illustrating a state in which a cover illustrated at the right side of FIG. 1 is removed.

Specific structural or functional descriptions of embodiments of the present disclosure disclosed in this specification or application are exemplified only for the purpose of explaining the embodiments according to the present disclosure, the embodiments according to the present disclosure maybe carried out in various forms, and it should not be interpreted that the present disclosure is limited to the embodiments described in this specification or application.

Because the embodiments according to the present disclosure may be variously changed and may have various forms, specific embodiments will be illustrated in the drawings and described in detail in the present specification or application. However, the descriptions of the specific embodiments are not intended to limit embodiments according to the concept of the present disclosure to the specific embodiments, but it should be understood that the present disclosure covers all modifications, equivalents and alternatives falling within the spirit and technical scope of the present disclosure.

The terms such as "first" and/or "second" may be used to describe various constituent elements, but these constituent elements should not be limited by these terms. These terms are used only for the purpose of distinguishing one constituent element from other constituent elements. For example, without departing from the scope according to the concept of the present disclosure, the first constituent element may be referred to as the second constituent element, and similarly, the second constituent element may also be referred to as the first constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements. Other expressions, that is, "between" and "just between" or "adjacent to" and "directly adjacent to", for explaining a relationship between constituent elements, should be interpreted in a similar manner.

The terms used in the present specification are used only for the purpose of describing particular embodiments and are not intended to limit the present disclosure. Singular expressions include plural expressions unless clearly described as different meanings in the context. In the present specification, it should be understood the terms "comprises," "comprising," "includes," "including," "containing," "has," "having" or other variations thereof are inclusive and therefore specify the presence of stated features, numbers, steps, operations, elements, components, or combinations thereof, but do not preclude the presence or addition of one or more other features, numbers, steps, operations, elements, components, or combinations thereof.

Unless otherwise defined, all terms used herein, including technical or scientific terms, have the same meaning as commonly understood by those skilled in the art to which the present disclosure pertains. The terms such as those defined in commonly used dictionaries should be interpreted as having meanings consistent with meanings in the context of related technologies and should not be interpreted as ideal or excessively formal meanings unless explicitly defined in the present specification.

A control unit (controller) according to an exemplary embodiment of the present disclosure may be implemented by a non-volatile memory (not illustrated) configured to perform algorithm for controlling operations of various constituent elements in a vehicle or store data related to software commands for executing the algorithm, and by a processor (not illustrated) configured to perform the following operations by using the data stored in the corresponding memory. In this case, the memory and the processor may be implemented as separate chips. Alternatively, the memory and the processor may be implemented as a single chip in which the memory and the processor are integrated. The processor may be configured in the form of one or more processors.

Hereinafter, an organ-type electronic pedal apparatus according to an exemplary embodiment of the present disclosure will be described with reference to the accompanying drawings.

As illustrated in FIGS. 1 to 12, an organ-type electronic pedal apparatus according to the present disclosure includes: a pedal housing 100 fixedly installed in a lower space of a driver seat; a pedal pad 300 coupled to the pedal housing 100 and configured to be rotatable forward or rearward about a hinge pin 200, the pedal pad 300 being configured to be operated by a driver; a hysteresis lever 400 positioned in the pedal housing 100 and having a lower side being in contact with the pedal housing 100, and an upper side inserted into the pedal pad 300 and being in contact with an inner surface of the pedal pad 300, the hysteresis lever 400 being configured to generate hysteresis by using a frictional force with the pedal pad 300 when the pedal pad 300 rotates; and a spring module 500 installed such that two opposite ends thereof are supported by the pedal pad 300 and the hysteresis lever 400.

The pedal housing 100 has a box shape having a vacant internal space in which the pedal pad 300, the hysteresis lever 400, the high-load spring module 500, a stroke sensor to be described below, a printed circuit board (PCB) to be described below, and the like are installed. Covers 110 are separably coupled to two opposite sides of the pedal housing.

The pedal pad 300 includes: a box-shaped pad part 310 having a pad surface 311 configured to be manipulated by the driver's foot, the pad part 310 being configured such that one end of the spring module 500 is inserted into the pad part 310 so that the pad part 310 is rotatably installed, and an upper side of the hysteresis lever 400 is inserted into the pad part 310 and in contact with an inner surface of the pad part 310; and a pedal arm part 320 having one end connected to the pad part 310 and the other end coupled to the hinge pin 200, the pedal arm part 320 being connected to a stroke sensor 600.

The pad part 310 and the pedal arm part 320 are connected in an L-shape when viewed from the lateral side, thereby constituting the organ-type pedal apparatus.

The pad part 310 penetrates a housing hole 120 formed in the pedal housing 100. The pad part 310 is inserted into the pedal housing 100 or protrudes from the pedal housing 100 depending on a rotation of the pedal pad 300. The pedal arm part 320 is always positioned in the pedal housing 100 regardless of the rotation of the pedal pad 300.

The pad part 310 is opened only at a lower side thereof into which the spring module 500 and the hysteresis lever 400 are inserted. All the remaining portion of the pad part 310 are sealed to prevent an inflow of foreign substances.

A lower end of a rear side of the pedal arm part 320 of the pedal pad 300 is coupled to be rotatable in a forward/rearward direction relative to the pedal housing 100 about the hinge pin 200. When the pedal arm part 320 rotates forward, the pad part 310 spaced apart forward and upward from the hinge pin 200 is inserted into the pedal housing 100 through the housing hole 120 formed in the pedal housing 100. When the pedal arm part 320 rotates rearward, the pad part 310 is exposed and protrudes rearward from the pedal housing 100 toward the driver.

An upper surface and a lower surface of the pad part 310 each have an arc shape having a trajectory having the same rotation radius as the pedal pad 300 around the hinge pin 200, such that a gap between the pad part 310 and the housing hole 120 formed in the pedal housing 100 may be constantly maintained, thereby maximally preventing an inflow of foreign substances.

The pad part 310 is installed to penetrate the housing hole 120 formed in the pedal housing 100. The pad part 310 is inserted into the pedal housing 100 or protrudes from the pedal housing 100 depending on the rotation of the pedal pad 300. The pedal arm part 320 is always positioned in the pedal housing 100 regardless of the rotation of the pedal pad 300, such that the pedal arm part 320 is prevented from coming into contact with the driver.

Therefore, when the driver manipulates the pedal pad 300 with his/her foot, only the pad surface 311 of the pad part 310 exposed from the pedal housing 100 may be manipulated, and the pedal arm part 320 positioned in the pedal housing 100 cannot be manipulated because the pedal arm part 320 is prevented from coming into contact with the driver's foot, thereby preventing an erroneous manipulation of the driver.

According to the present disclosure, a foreign-substance-inflow-prevention guide 130 is coupled to the housing hole

120 and disposed along a rim of the housing hole 120 formed in the pedal housing 100.

The foreign-substance-inflow-prevention guide 130 may serve to eliminate a gap between the housing hole 120 of the pedal housing 100 and the pad part 310 of the pedal pad 300, thereby preventing foreign substances from flowing into the pedal housing 100 through the housing hole 120.

The foreign-substance-inflow-prevention guide 130 may be made of a rubber material having elasticity to prevent abrasion and noise caused by contact with the pad part 310, but the present disclosure is not limited thereto.

The spring module 500 is a high-load spring module. The spring module 500 is installed to be positioned in an oblique direction in a direction in which the pad part 310 moves. An upper end of the spring module 500 is inserted into the pad part 310 of the pedal pad 300 and rotatably coupled to the pad part 310, and an intermediate portion between the upper and lower ends of the spring module 500 is installed to be rotatable while being in contact with the hysteresis lever 400.

A high load is required to manipulate the pedal apparatus for a vehicle in order to ensure safety. To this end, the embodiment according to the present disclosure adopts the high-load spring module 500. The high-load spring module 500 may be used to a necessary pedal effort.

The high-load spring module 500 typically may have two or more springs and two or more dampers disposed in series to implement the pedal effort.

In the embodiment according to the present disclosure, the electronic pedal apparatus further includes a plurality of stroke sensors 600 fixedly installed in the pedal housing 100 and connected to the pedal pad 300. The plurality of stroke sensors 600 generates signals related to pedal functions when the pedal pad 300 rotates.

The stroke sensor 600 has a sensor lever 610 rotatably coupled, and the sensor lever 610 is coupled to a sensor pin 330 provided on the pedal pad 300. When the pedal pad 300 rotates relative to the pedal housing 100, the sensor lever 610 rotates by means of the sensor pin 330.

The sensor pin 330 is positioned above the hinge pin 200 coupled to the pedal arm part 320 and protrudes toward two opposite sides of the pedal arm part 320.

The sensor pin 330 is disposed between the pad part 310 and the hinge pin 200 and protrudes from the pedal arm part 320 toward the two opposite sides of the pedal arm part 320.

Since the sensor pin 330 is provided on the pedal arm part 320, a position of the stroke sensor 600 may be adjacent to the pedal arm part 320, which makes it possible to reduce an overall size.

The stroke sensor 600 serves to detect whether the pedal pad 300 returns to an initial position when the pedal pad 300 rotates. The stroke sensor 600 also serves to detect a rotation of the pedal pad 300 when the driver presses and operates the pedal pad 300.

The stroke sensor 600 includes a permanent magnet and a PCB facing the permanent magnet. When the pedal pad 300 is rotated by the manipulation of the driver, the stroke sensor 600 detects a rotation angle of the pedal pad 300 based on a change in intensity of a magnetic field that varies depending on a change in position of the permanent magnet, and then the stroke sensor 600 generates a signal related to the pedal function.

The stroke sensor 600 may be any one of an accelerator position sensor (APS) configured to generate a signal related to acceleration and a brake position sensor (BPS) configured to generate a signal related to braking.

Therefore, the electronic pedal apparatus according to the present disclosure may be used as any one of an accelerator pedal apparatus and a brake pedal apparatus or both the accelerator pedal apparatus and the brake pedal apparatus.

The stroke sensor 600 according to the embodiment of the present disclosure is the contact sensor connected to the pedal pad 300 by means of the sensor lever 610 which is a mechanical structure. However, in some instances, the stroke sensor 600 may be configured as a contactless sensor only including a permanent magnet and a PCB.

The hysteresis lever 400 according to the present disclosure includes: a lower bottom part 410 having circular hinge parts 411 formed at two opposite left and right sides of the lower bottom part 410 and installed to be in line contact with the pedal housing 100; and two opposite lateral parts 420 connected to the circular hinge parts 411 and extending upward, the two opposite lateral parts 420 being inserted into the pad part 310 and respectively having upper inner surfaces connected to the spring module 500 and upper outer surfaces being in contact with left and right inner surfaces of the pad part 310.

The circular hinge parts 411 each having a circular cross-section are formed at left and right ends of the lower bottom part 410. The hysteresis lever 400 is installed so that the circular hinge parts 411 are in point contact with an inner bottom surface of the pedal housing 100.

The two opposite lateral parts 420 extend upward from the circular hinge parts 411, and the two opposite lateral parts 420 are disposed in parallel with each other.

The lower bottom part 410 and the two opposite lateral parts 420 of the hysteresis lever 400 are connected in a U shape. Therefore, when the pedal pad 300 rotates, the two opposite lateral parts 420 come into contact with the left and right inner surfaces of the pad part 310, thereby implementing hysteresis by using a frictional force.

According to the present disclosure, a rubber damper 430 is coupled to the lower bottom part 410 of the hysteresis lever 400 and creates a pedal effort while being elastically deformed by the contact with the pedal arm part 320 when the pedal pad 300 rotates.

Arc-shaped inclined grooves 440 are formed in upper end inner surfaces of the two opposite lateral parts 420 of the hysteresis lever 400, and the spring module 500 is rotatably seated in the arc-shaped inclined grooves 440. The arc-shaped inclined grooves 440 guide the downward movement of the spring module 500 when the spring module 500 is compressed by a rotation of the pedal pad 300. Arc-shaped inclined protrusions 510 are formed on the spring module 500, matched in shape with the arc-shaped inclined grooves 440, and installed to be inserted into the arc-shaped inclined grooves 440. The arc-shaped inclined protrusions 510 protrude toward two opposite sides.

The arc shapes of the arc-shaped inclined grooves 440 are formed in a forward/rearward direction of the two opposite lateral parts 420. The inclinations of the arc-shaped inclined grooves 440 are formed in an upward/downward direction of the two opposite lateral parts 420, and the arc-shaped inclined grooves 440 are inclined so that an interval between the two opposite lateral parts 420 decreases toward the lower bottom part 410.

The arc shapes and inclinations of the arc-shaped inclined protrusions 510 are identical to those of the arc-shaped inclined grooves 440, such that the arc-shaped inclined protrusions 510 are matched with the arc-shaped inclined grooves 440.

In the hysteresis lever 400 according to the present disclosure, a cross-sectional thickness of the lower bottom part 410 is smaller than a cross-sectional thickness of each of the two opposite lateral parts 420.

That is, the two opposite lateral parts 420 of the hysteresis lever 400 move outward away from each other with respect to the circular hinge part 411 when the pad part 310 is inserted into the pedal housing 100 by the rotation of the pedal pad 300 and the arc-shaped inclined protrusions 510 move downward along the arc-shaped inclined grooves 440 of the hysteresis lever 400 while the spring module 500 is compressed. To this end, the hysteresis lever 400 may be formed such that the cross-sectional thickness of the lower bottom part 410 is smaller than the cross-sectional thickness of each of the two opposite lateral parts 420.

In addition, the hysteresis lever 400 according to the present disclosure is formed such that the cross-sectional thickness of each of the two opposite lateral parts 420 is larger than the cross-sectional thickness of the lower bottom part 410.

That is, the pad part 310 is inserted into the pedal housing 100 by the rotation of the pedal pad 300, the arc-shaped inclined protrusions 510 move downward along the arc-shaped inclined grooves 440 of the hysteresis lever 400 while the spring module 500 is compressed, and the two opposite lateral parts 420 of the hysteresis lever 400 move outward away from each other with respect to the circular hinge part 411 and come into contact with the left and right inner surfaces of the pad part 310, thereby implementing a high frictional force and thus implementing high hysteresis. To this end, the hysteresis lever 400 may be formed such that the cross-sectional thickness of each of the two opposite lateral parts 420 is larger than the cross-sectional thickness of the lower bottom part 410.

According to the present disclosure, guide grooves 450 are formed in upper end outer surfaces of the two opposite lateral parts 420 of the hysteresis lever 400 and extend along a rotation radius of the pedal pad 300 defined about the hinge pin 200. Guide protrusions 340 are formed in the left and right inner surfaces of the pad part 310 so as to extend along the rotation radius of the pedal pad 300 and inserted into the guide grooves 450. The coupling between the guide grooves 450 and the guide protrusions 340 prevents the forward and rearward movements of the hysteresis lever 400 when the pedal pad 300 rotates, thereby preventing the separation of the hysteresis lever 400. The coupling between the guide grooves 450 and the guide protrusions 340 also serves to guide the rotation of the pedal pad 300.

According to the present disclosure, the upper end of the spring module 500 is inserted into the pad part 310 of the pedal pad 300 and rotatably coupled to the pad part 310, the arc-shaped inclined protrusions 510 of the spring module 500 are installed to be inserted into the arc-shaped inclined grooves 440 of the hysteresis lever 400, and the guide protrusions 340 of the pad part 310 are installed to be inserted into the guide grooves 450 of the hysteresis lever 400, such that outer surfaces of the two opposite lateral parts 420 of the hysteresis lever 400 are always kept in contact with the left and right inner surfaces of the pad part 310. Therefore, it is possible to implement the hysteresis by using the frictional force generated by the contact between the pad part 310 and the two opposite lateral parts 420 of the hysteresis lever 400 when the pedal pad 300 rotates. In particular, it is possible to generate an initial operating force for the pedal pad 300 by using the spring force of the spring module 500.

According to the pedal apparatus according to the present disclosure, the pad part 310 is rotated and inserted into the pedal housing 100 as the driver manipulates the pedal pad 300, the arc-shaped inclined protrusions 510 move downward along the arc-shaped inclined grooves 440 of the hysteresis lever 400 while the spring module 500 is compressed, and the two opposite lateral parts 420 of the hysteresis lever 400 move outward away from each other with respect to the circular hinge part 411, such that the force applied by the two opposite lateral parts 420 of the hysteresis lever 400 to press the left and right inner surfaces of the pad part 310 is increased, which increases the frictional force. Therefore, the increased frictional force implements high hysteresis when the pedal pad 300 is manipulated.

According to the pedal apparatus according to the present disclosure, the lower end of the spring module 500 and the lower bottom part 410 of the hysteresis lever 400 are spaced apart from each other when the driver manipulates the pedal pad 300 to rotate the spring module 500.

That is, when the pedal pad 300 normally rotates, the lower end of the spring module 500 and the lower bottom part 410 of the hysteresis lever 400 are always kept spaced apart from each other regardless of the downward movement and compression of the spring module 500. As a result, it is possible to smoothly implement hysteresis by the operation of the hysteresis lever 400 made by the manipulation of the pedal pad 300.

The pad part 310 is rotated and inserted into the pedal housing 100 as the driver manipulates the pedal pad 300, the arc-shaped inclined protrusions 510 move downward along the arc-shaped inclined grooves 440 of the hysteresis lever 400 while the spring module 500 is compressed, and the two opposite lateral parts 420 of the hysteresis lever 400 move outward away from each other with respect to the circular hinge part 411, such that the hysteresis is implemented by the friction with the pad part 310. In this case, a state in which the arc-shaped inclined protrusions 510 of the spring module 500 do not separate from the arc-shaped inclined grooves 440 of the hysteresis lever 400 may be defined as a normal rotation state of the pedal pad 300.

However, the lower end of the spring module 500 comes into contact with the lower bottom part 410 of the hysteresis lever 400 in the case in which the spring module 500 abnormally moves downward excessively so that the arc-shaped inclined protrusions 510 of the spring module 500 separate from the arc-shaped inclined grooves 440 of the hysteresis lever 400 when the spring module 500 moves downward while the pad part 310 is inserted into the pedal housing 100 by the rotation of the pedal pad 300. As a result, it is possible to prevent the hysteresis from excessively increasing.

The situation in which the spring module 500 abnormally moves downward excessively may be caused by tolerance or durability conditions during the process of manufacturing the components.

If the hysteresis excessively increases because the lower end of the spring module 500 does not come into contact with the lower bottom part 410 of the hysteresis lever 400, the frictional force between the pad part 310 and the two opposite lateral parts 420 of the hysteresis lever 400 excessively increases than necessary. In this case, the speed of returning the hysteresis lever 400 and the pedal pad 300 is decreased, which causes concern that the smooth operation of the pedal apparatus deteriorates.

Figure 3:
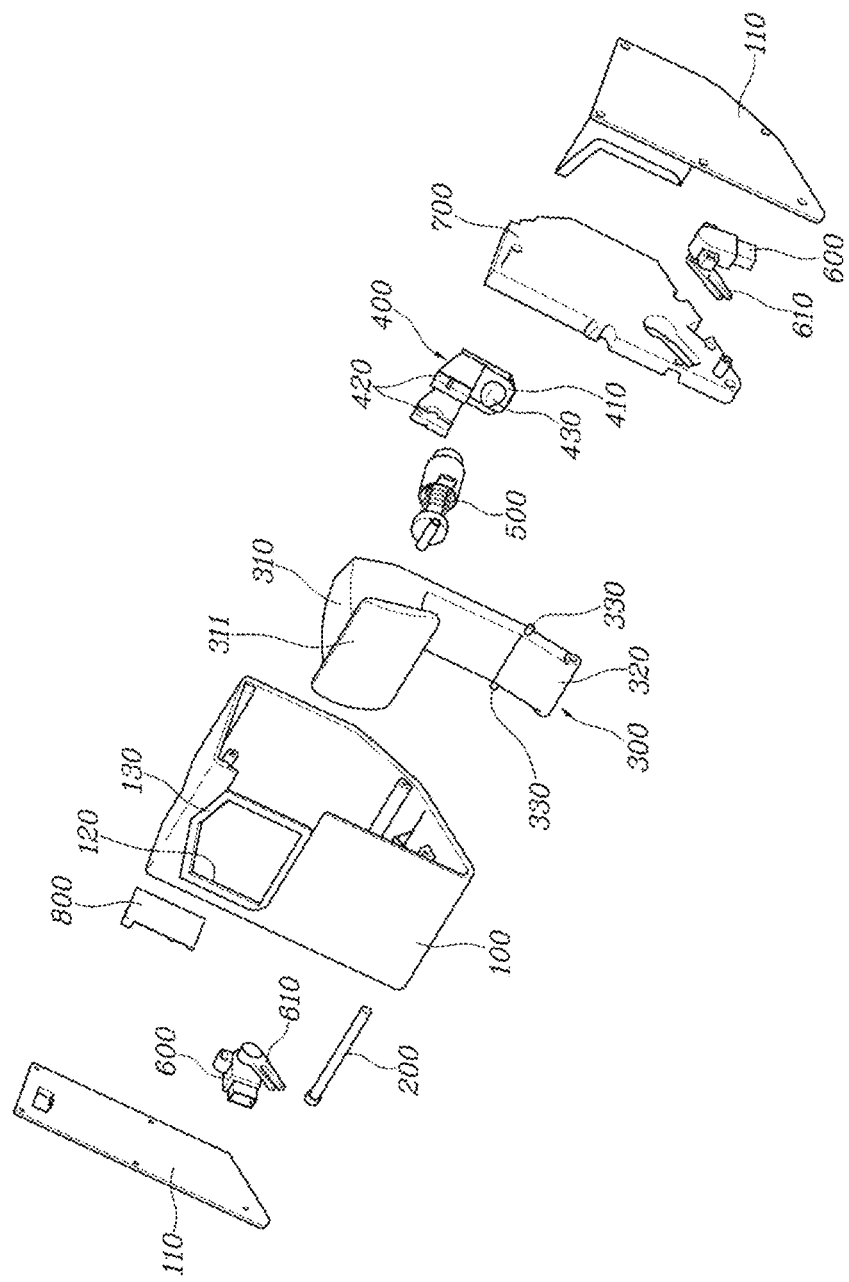
FIG. 3 is an exploded view of FIG. 1.
Figure 4:
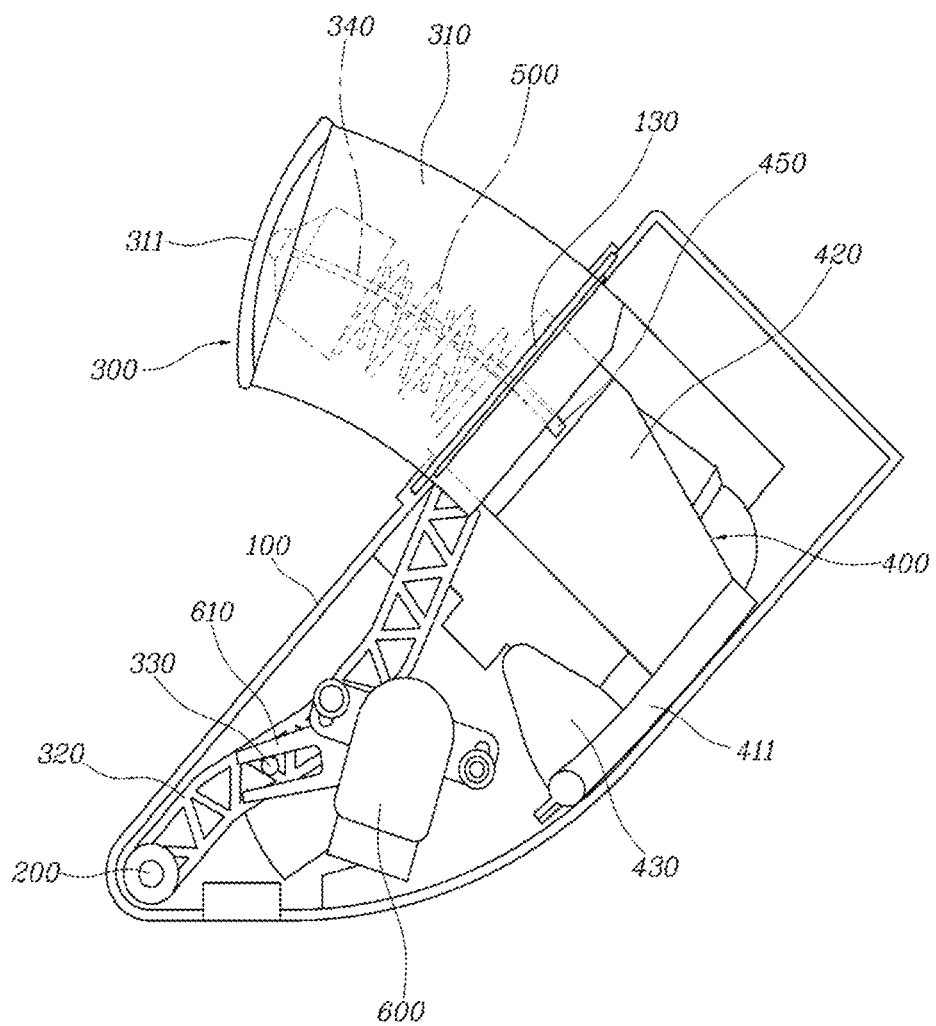
FIG. 4 is a side view illustrating an internal structure of the pedal apparatus according to the present disclosure and illustrating a state before a pedal pad is manipulated.
Figure 5:
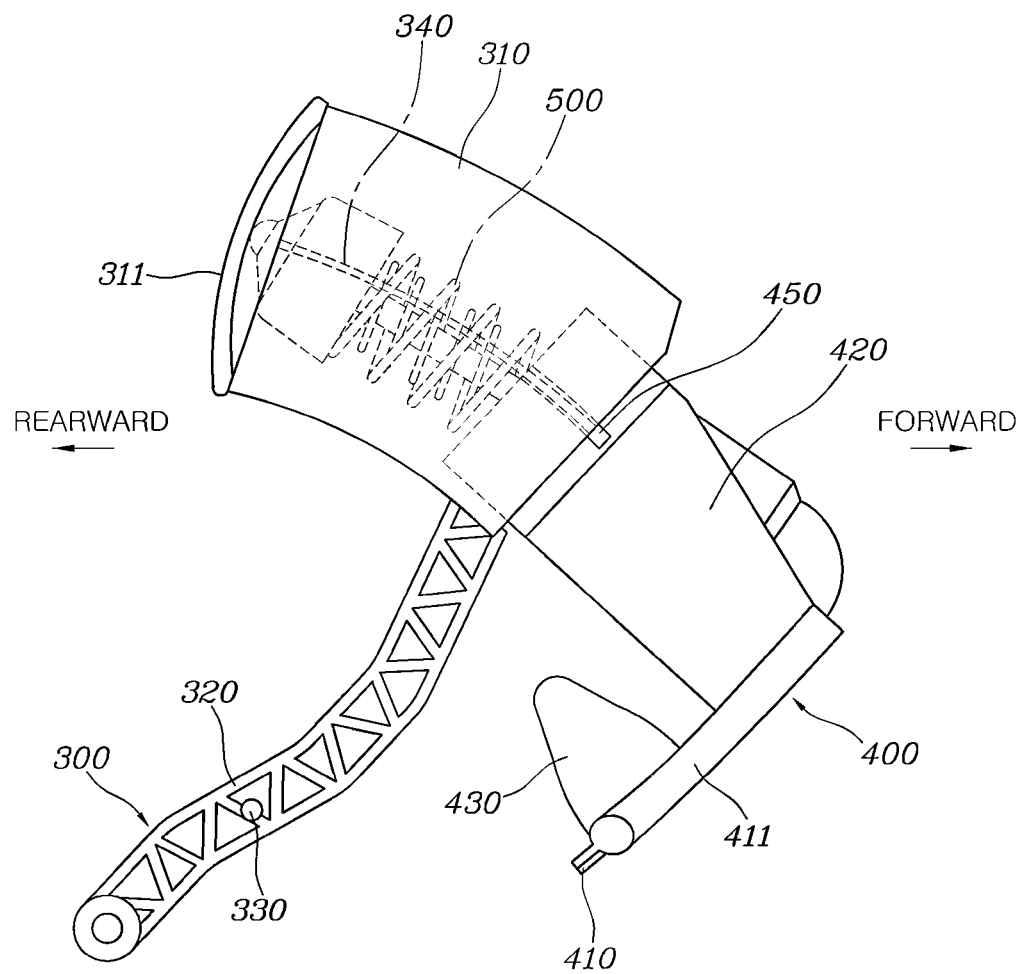
FIG. 5 is a view illustrating the pedal pad and a hysteresis lever illustrated in FIG. 4.
Figure 6:
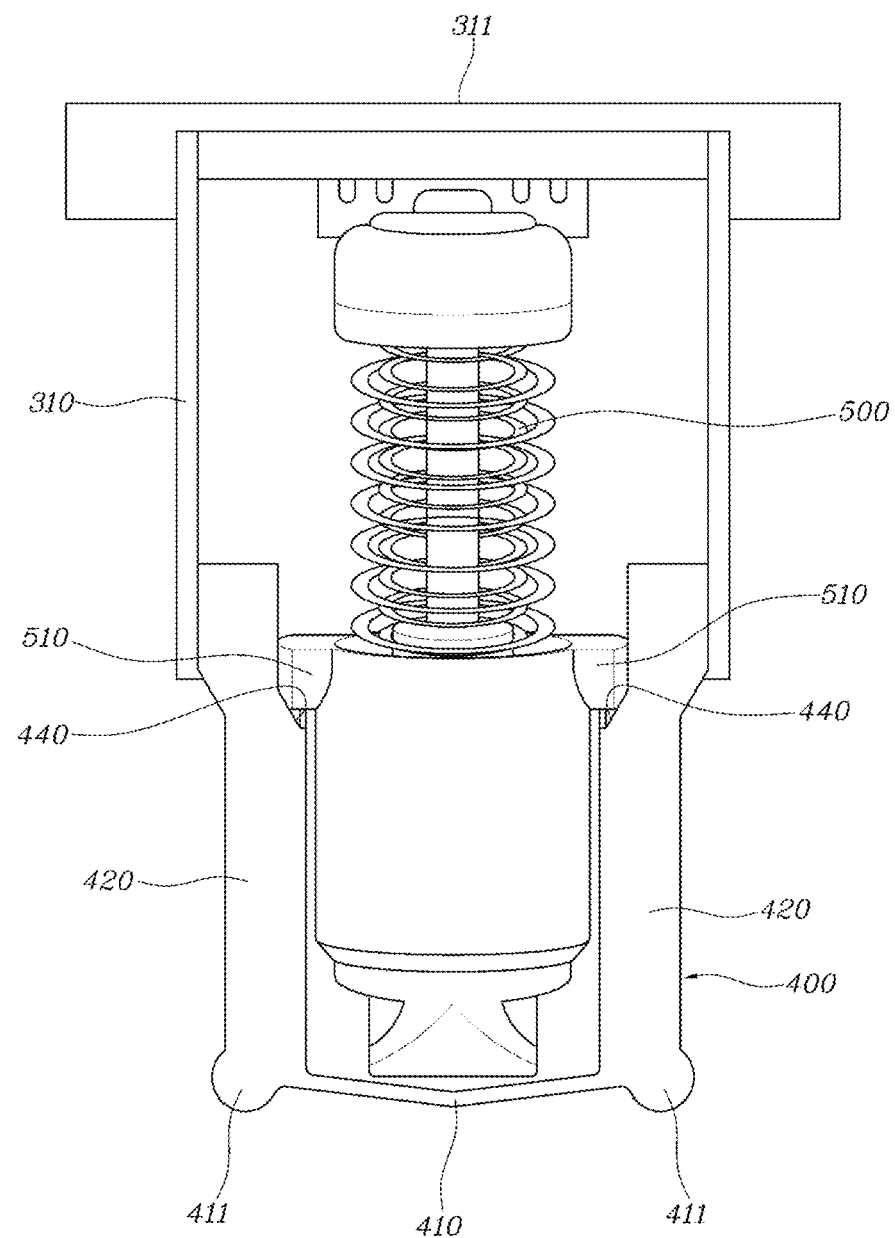
FIG. 6 is a view illustrating a front side of FIG. 5.
Figure 7:
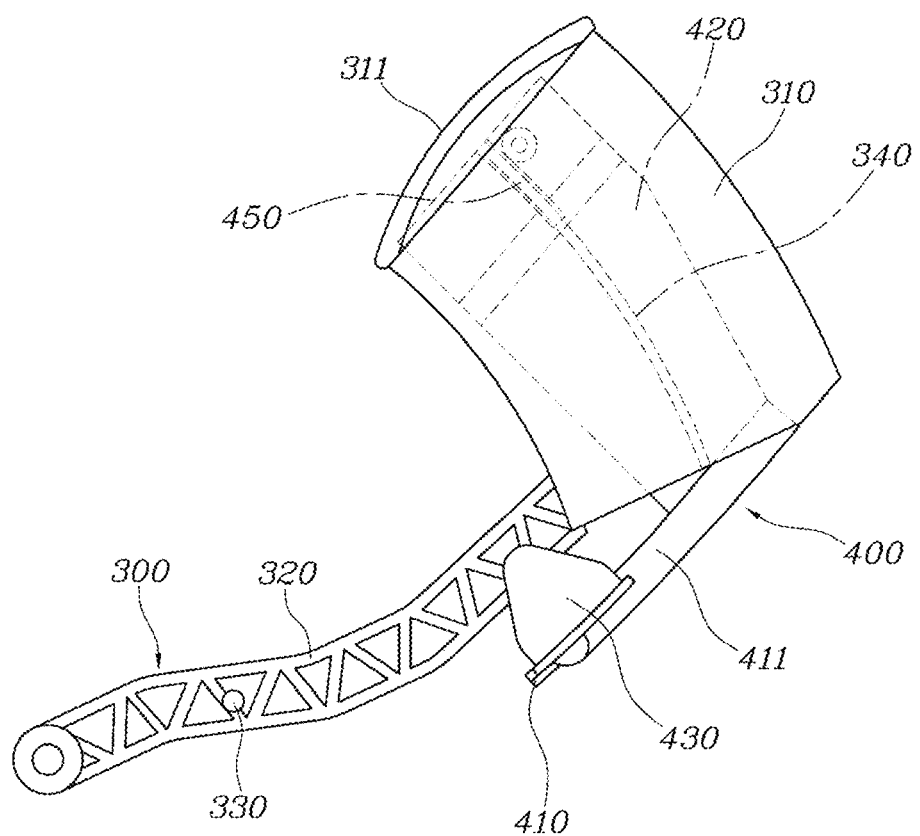
FIG. 7 is a view illustrating a state in which two opposite lateral parts of the hysteresis lever are inserted into a pad part by manipulation of the pedal pad illustrated in FIG. 5.
Figure 8:
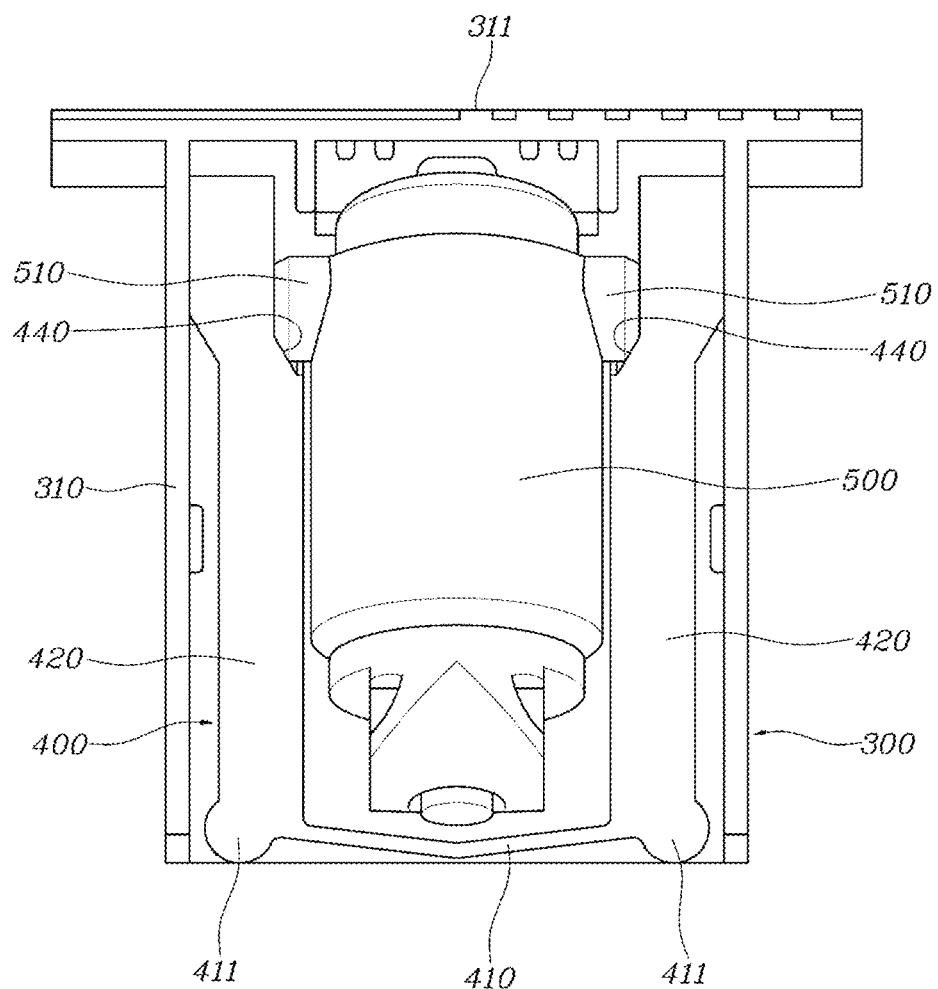
FIG. 8 is a view illustrating a front side of FIG. 7.
Figure 9:
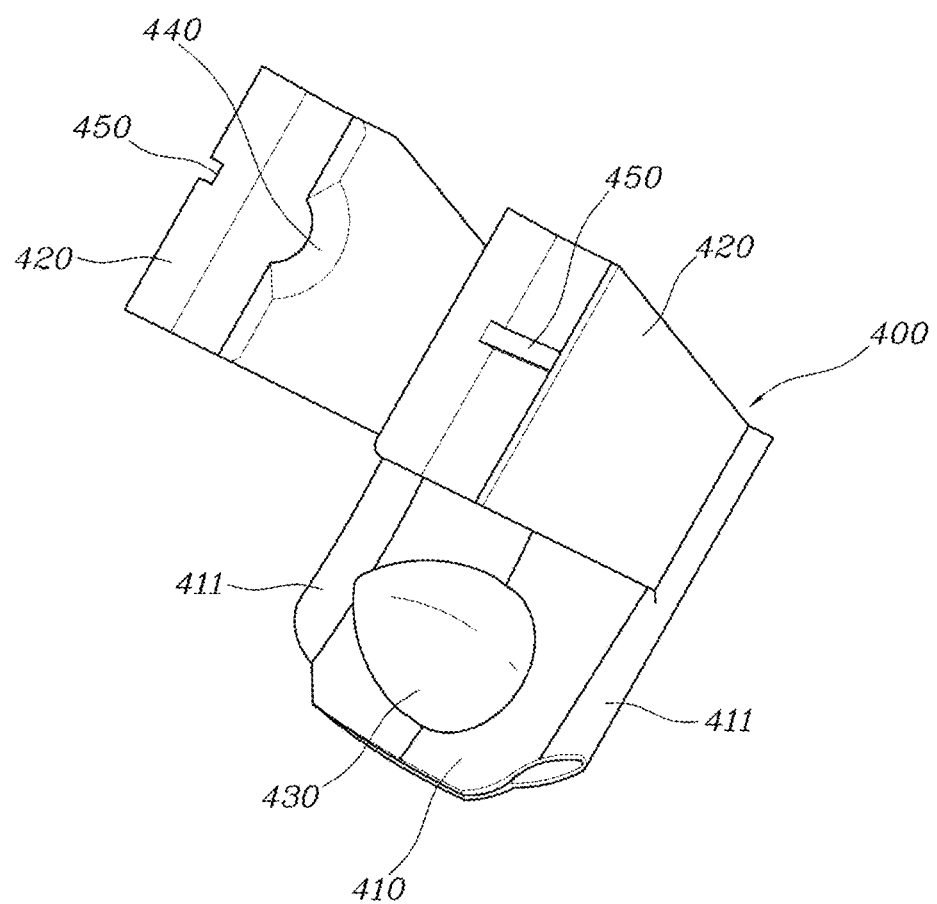
FIG. 9 is a view illustrating the hysteresis lever according to the present disclosure.
Figure 10:
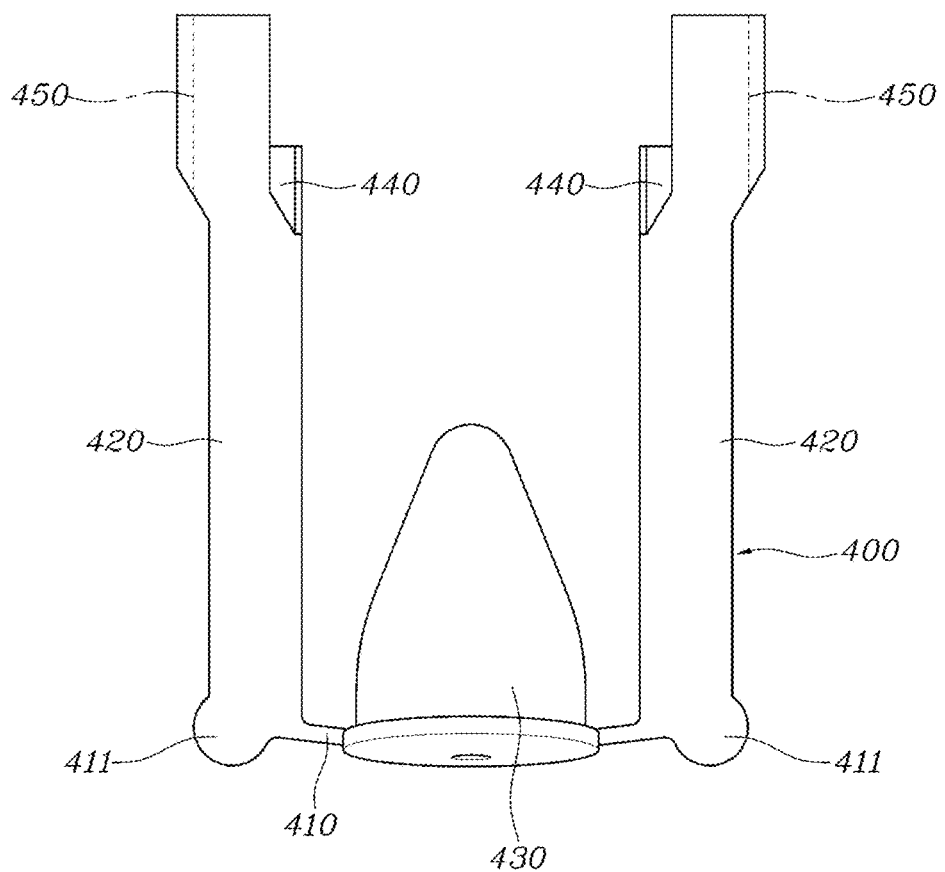
FIG. 10 is a front view of FIG. 9.
Figure 11:
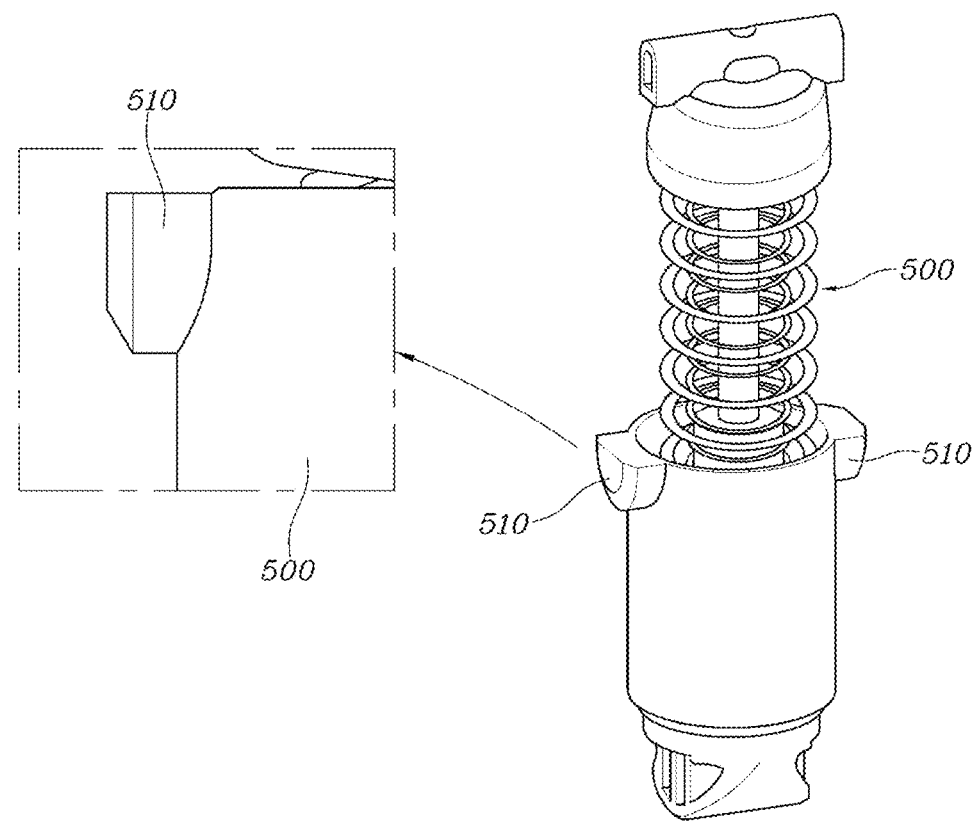
FIG. 11 is a view illustrating a spring module according to the present disclosure.
Figure 12:
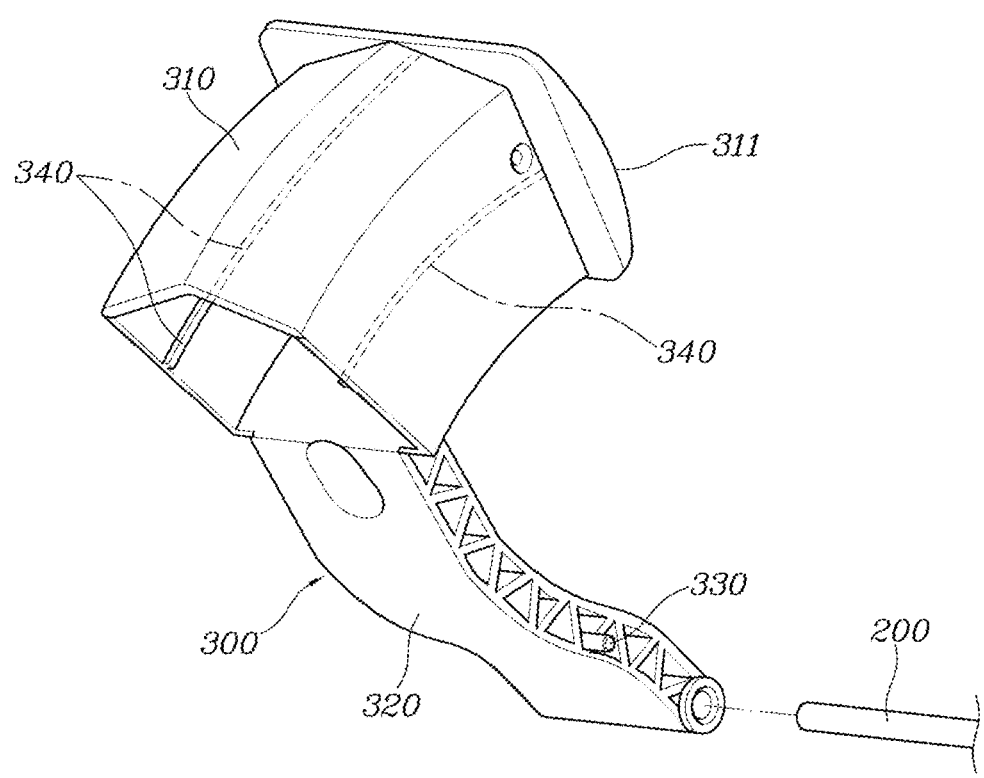
FIG. 12 is a view illustrating the pedal pad according to the present disclosure.

Non-described reference numeral 700 illustrated in FIG. 3 indicates an inner bracket installed to be positioned in the pedal housing 100, and the stroke sensor 600 may be fixedly installed on the inner bracket. In addition, non-described reference numeral 800 indicates the PCB fixedly installed in the pedal housing 100, and the PCB performs failure diagnosis and CAN communication with components related to the pedal.

As described above, the organ-type electronic pedal apparatus according to the present disclosure includes the high-load spring module 500 and the hysteresis lever 400. The organ-type electronic pedal apparatus may tune the pedal effort, the stroke, and the hysteretic force, which are required to vary depending on the types of vehicles, by changing the components of the hysteresis lever 400, as necessary. Therefore, it is possible to reduce costs, simplify the configuration, miniaturize the package, reduce production costs, and minimize the fatigue of the driver's ankle.

While the specific embodiments of the present disclosure have been illustrated and described, it will be obvious to those skilled in the art that the present disclosure may be variously modified and changed without departing from the technical spirit of the present disclosure defined in the appended claims.

What is claimed is:

1. An organ-type electronic pedal apparatus comprising:
a pedal housing;
a pedal pad rotatably coupled to the pedal housing by a hinge pin and to be manipulated by a driver;
a hysteresis lever positioned in the pedal housing and having a lower side being in contact with the pedal housing and an upper side inserted into the pedal pad and being in contact with an inner surface of the pedal pad, the hysteresis lever to generate hysteresis by a frictional force between the pedal pad and the hysteresis lever when the pedal pad rotates;
a spring module installed to be supported on the pedal pad and the hysteresis lever; and
a plurality of stroke sensors fixed to the pedal housing, connected to the pedal pad, and configured to generate signals related to a pedal function when the pedal pad rotates, the pedal pad comprising:
a box-shaped pad part having a pad surface to be manipulated by the driver's foot, one end of the spring module is inserted into the pad part and rotatably installed, and an upper side of the hysteresis lever is inserted into the pad part and in contact with an inner surface of the pad part; and
a pedal arm part having one end connected to the pad part and the other end coupled to the hinge pin and connected to at least one of the stroke sensors.

2. The organ-type electronic pedal apparatus of claim 1, wherein the pad part and the pedal arm part are connected in an L shape.

3. The organ-type electronic pedal apparatus of claim 1, wherein a sensor pin is disposed on the pedal arm part and disposed above the hinge pin, and the sensor pin is coupled to a sensor lever of at least one of the stroke sensors.

4. The organ-type electronic pedal apparatus of claim 1, wherein the pad part penetrates a housing hole disposed in the pedal housing and is inserted into the pedal housing or protrudes from the pedal housing depending on a rotation of the pedal pad, and
wherein the pedal arm part is positioned always in the pedal housing regardless of the rotation of the pedal pad.

5. The organ-type electronic pedal apparatus of claim 1, wherein a housing hole is disposed in the pedal housing, the pad part penetrates the housing hole, and a foreign-substance-inflow-prevention guide is coupled along a rim of the housing hole.

6. The organ-type electronic pedal apparatus of claim 1, wherein the hysteresis lever comprises:
a lower bottom part having circular hinge parts disposed at two opposite left and right sides of the lower bottom part and installed to be in line contact with the pedal housing; and
two opposite lateral parts connected to the circular hinge parts and extending upward, the two opposite lateral parts being inserted into the pad part and respectively having upper inner surfaces connected to the spring module and upper outer surfaces being in contact with left and right inner surfaces of the pad part.

7. The organ-type electronic pedal apparatus of claim 6, wherein the lower bottom part and the two opposite lateral parts are connected in a U shape.

8. The organ-type electronic pedal apparatus of claim 6, wherein a rubber damper is coupled to the lower bottom part and creates a pedal effort while being elastically deformed by contact with the pedal arm part when the pedal pad rotates.

9. The organ-type electronic pedal apparatus of claim 6, wherein arc-shaped inclined grooves are disposed in upper end inner surfaces of the two opposite lateral parts, the spring module is rotatably seated in the arc-shaped inclined grooves, the arc-shaped inclined grooves guide a downward movement of the spring module when the spring module is compressed by a rotation of the pedal pad, arc-shaped inclined protrusions are disposed on the spring module, matched in shape with the arc-shaped inclined grooves, and installed to be inserted into the arc-shaped inclined grooves, and the arc-shaped inclined protrusions protrude toward two opposite sides.

10. The organ-type electronic pedal apparatus of claim 9, wherein the arc shapes of the arc-shaped inclined grooves are disposed in a forward/rearward direction of the two opposite lateral parts, the inclinations of the arc-shaped inclined grooves are disposed in an upward/downward direction of the two opposite lateral parts, and the arc-shaped inclined grooves are inclined so that an interval between the two opposite lateral parts decreases toward the lower bottom part.

11. The organ-type electronic pedal apparatus of claim 9, wherein a cross-sectional thickness of the lower bottom part of the hysteresis lever is smaller than a cross-sectional thickness of each of the two opposite lateral parts so that the two opposite lateral parts of the hysteresis lever move outward away from each other with respect to the circular hinge part when the pad part is inserted into the pedal housing by the rotation of the pedal pad and the arc-shaped inclined protrusions move downward along the arc-shaped inclined grooves of the hysteresis lever while the spring module is compressed.

12. The organ-type electronic pedal apparatus of claim 9, wherein a cross-sectional thickness of each of the two opposite lateral parts of the hysteresis lever is larger than a cross-sectional thickness of the lower bottom part so that a frictional force is implemented when the pad part is inserted into the pedal housing by the rotation of the pedal pad, the arc-shaped inclined protrusions move downward along the arc-shaped inclined grooves of the hysteresis lever while the spring module is compressed, and the two opposite lateral parts of the hysteresis lever move outward away from each other with respect to the circular hinge part and come into contact with the left and right inner surfaces of the pad part.

13. The organ-type electronic pedal apparatus of claim 6, wherein guide grooves are disposed in upper end outer surfaces of the two opposite lateral parts and extend along a rotation radius of the pedal pad, guide protrusions are disposed in the left and right inner surfaces of the pad part so as to extend along the rotation radius of the pedal pad and inserted into the guide grooves, and the coupling between the guide grooves and the guide protrusions prevents forward and rearward movements of the hysteresis lever when the pedal pad rotates.

14. The organ-type electronic pedal apparatus of claim 9, wherein the pad part is inserted into the pedal housing by the rotation of the pedal pad, the arc-shaped inclined protrusions move downward along the arc-shaped inclined grooves of the hysteresis lever while the spring module is compressed, and the two opposite lateral parts of the hysteresis lever move outward away from each other with respect to the circular hinge part, such that a force applied by the two opposite lateral parts of the hysteresis lever to press the left and right inner surfaces of the pad part is increased, the frictional force is increased, and the increased frictional force implements hysteresis when the pedal pad is manipulated.

15. The organ-type electronic pedal apparatus of claim 6, wherein when the pedal pad normally rotates, a lower end of the spring module and the lower bottom part of the hysteresis lever are always kept spaced apart from each other regardless of a downward movement and compression of the spring module.

16. The organ-type electronic pedal apparatus of claim 9, wherein in a case in which the spring module abnormally moves downward so that the arc-shaped inclined protrusions of the spring module separate from the arc-shaped inclined grooves of the hysteresis lever when the spring module moves downward while the pad part is inserted into the pedal housing by the rotation of the pedal pad, a lower end of the spring module comes into contact with the lower bottom part of the hysteresis lever such that hysteresis is prevented from increasing.

17. The organ-type electronic pedal apparatus of claim 1, wherein the organ-type electronic pedal apparatus is an accelerator pedal apparatus or a brake pedal apparatus.

* * * * *